(12) United States Patent
Babaei et al.

(10) Patent No.: US 9,553,639 B2
(45) Date of Patent: Jan. 24, 2017

(54) LOCATING USER EQUIPMENT IN A WIRELESS NETWORK

(71) Applicant: Cable Television Laboratories, Inc., Louisville, CO (US)

(72) Inventors: Alireza Babaei, Westminster, CO (US); Luis Alberto Campos, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 98 days.

(21) Appl. No.: 14/471,211

(22) Filed: Aug. 28, 2014

(65) Prior Publication Data

US 2015/0163851 A1    Jun. 11, 2015

Related U.S. Application Data

(60) Provisional application No. 61/913,797, filed on Dec. 9, 2013.

(51) Int. Cl.
| | |
|---|---|
| *H04B 7/04* | (2006.01) |
| *H04W 4/02* | (2009.01) |
| *H04W 64/00* | (2009.01) |

(52) U.S. Cl.
CPC .......... *H04B 7/0413* (2013.01); *H04W 4/021* (2013.01); *H04W 64/00* (2013.01)

(58) Field of Classification Search
CPC ...... H04W 88/04; H04W 4/021; H04B 7/0413
See application file for complete search history.

(56) References Cited

U.S. PATENT DOCUMENTS

| | | | | |
|---|---|---|---|---|
| 6,493,759 B1* | 12/2002 | Passman | ........... | H04W 84/20 455/446 |
| 8,411,608 B2 | 4/2013 | Chandra et al. | | |
| 8,532,074 B2 | 9/2013 | Navda et al. | | |
| 2006/0009236 A1* | 1/2006 | Bose | ........... | G01S 5/0252 455/456.1 |
| 2006/0067420 A1* | 3/2006 | Li | ........... | H04L 25/0226 375/267 |
| 2008/0090528 A1* | 4/2008 | Malladi | ........... | H04L 1/0004 455/70 |
| 2011/0201351 A1* | 8/2011 | Chen | ........... | H04W 4/021 455/456.1 |
| 2013/0172020 A1* | 7/2013 | Aweya | ........... | G01S 5/0252 455/457 |

* cited by examiner

*Primary Examiner* — Mohammad Anwar
(74) *Attorney, Agent, or Firm* — Duft Bornsen & Fettig LLP; Gregory T. Fettig (57) ABSTRACT

Systems and methods presented herein provide for locating user equipment (UE) in a wireless communication network. The system includes one or more wireless access points, wherein each wireless access point is operable to detect signal of a UE in the wireless communication network, and to train with the UE to establish a communication link with the UE. The system also includes a network processing element communicatively coupled to the wireless access points and operable to extract channel estimation and signal strength information of the UE from the wireless access points via said training with the UE, to compare the channel estimation and signal strength information of the UE from the wireless access points to stored signatures of the UE, and to determine a location of the UE in the wireless communication network based on the comparisons.

17 Claims, 6 Drawing Sheets

LOCATING USER EQUIPMENT IN A WIRELESS NETWORK

CROSS REFERENCE TO RELATED APPLICATIONS

This patent application claims priority to, and thus the benefit of an earlier filing date from, U.S. Provisional Patent Application No. 61/913,797 (filed Dec. 9, 2013), the entire contents of which are hereby incorporated by reference.

BACKGROUND

Various techniques exist for locating user equipment (UE), such as cell phones, in a wireless network. Early versions of locating UEs included cell tower triangulation, a fairly inaccurate location solution. Since then, many UEs have been configured with global positioning system (GPS) modules that quickly and accurately identify the location of the UE via GPS satellites. However, GPS location solutions are often ineffective indoors as the satellite signals are faint and unable to propagate through certain structures.

Signal strength ""fingerprint"" techniques have been considered as a solution for indoor localization. In these fingerprint-based techniques, a set of different ""training locations"" is employed with each location being associated with a parameter of the radio frequency (RF) signal received by one or more indoor wireless access points. Received signal strength values from the wireless access points are concatenated to form a ""fingerprint vector"" in which the location of the UE is then estimated using various algorithms. However, this solution is also fairly inaccurate in that the amount of data used in the estimation relies on a single type of variable data (i.e., the received signal strength), much like the earlier location techniques of cell tower triangulation.

SUMMARY

Systems and methods presented herein provide for locating user equipment (UE) in a wireless communication network. The system includes one or more wireless access points, wherein each wireless access point is operable to detect signal of a UE in the wireless communication network, and to train with the UE to establish a communication link with the UE. The system also includes a network processing element communicatively coupled to the wireless access points and operable to extract channel estimation and signal strength information of the UE from the wireless access points via said training with the UE, to compare the channel estimation and signal strength information of the UE from the wireless access points to stored signatures of the UE, and to determine a location of the UE in the wireless communication network based on the comparisons.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
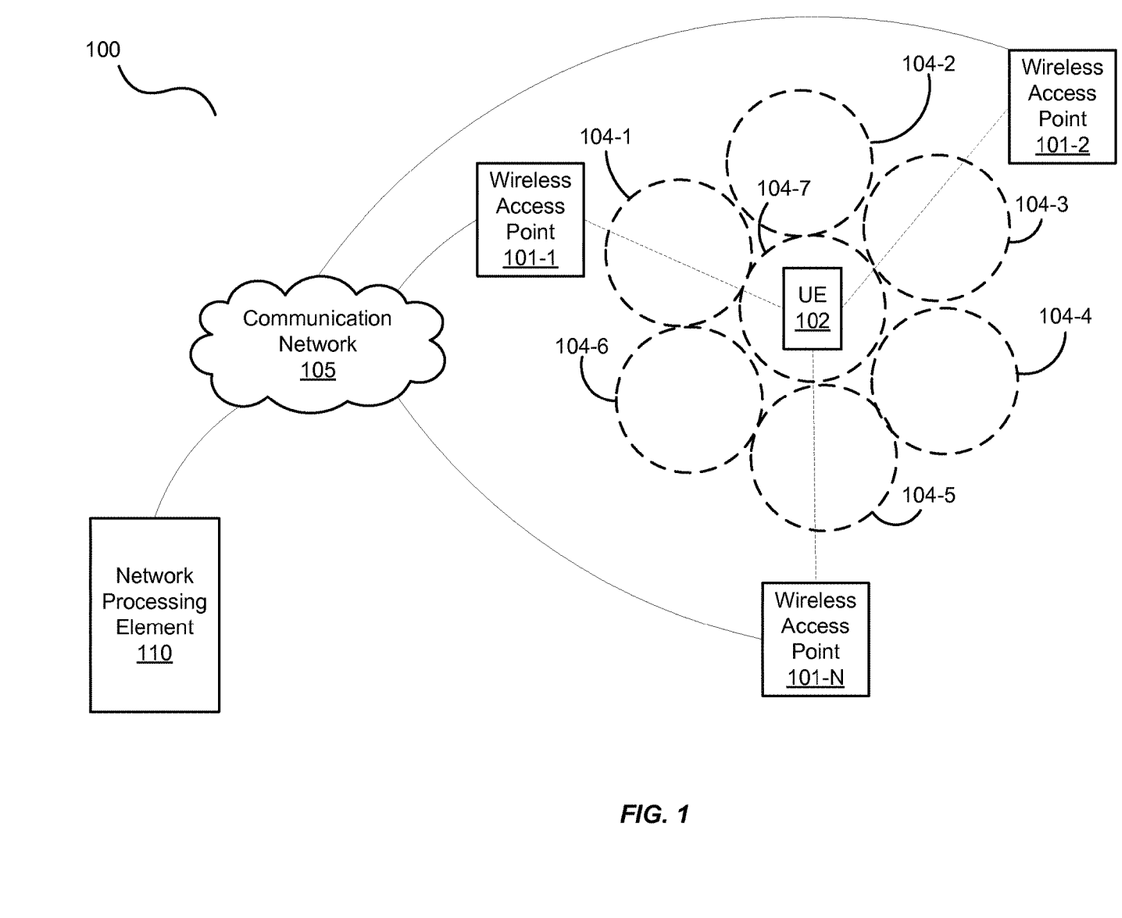
FIG. 1 is a block diagram of an exemplary wireless telecommunication system operable to locate user equipment.

FIG. 1 is a block diagram of an exemplary wireless telecommunication system 100 operable to locate UEs 102. Generally, the wireless telecommunication system 100 is any system capable of wirelessly communicating with UEs 102, such as cell phones, tablet computers, laptop computers, and the like through a communication network 105. Examples of the wireless telecommunication system 100 include Wi-Fi networks and wireless communication networks, such as 3G, 4G, 5G, Long Term Evolution (LTE), and the like.

Wireless access points 101-1-101-N provide wireless access to the wireless telecommunication system 100 (wherein the reference ""N"" is merely intended to represent an integer greater than 1 and not necessarily equal to any other ""N"" reference disclosed herein). For example, in a Wi-Fi network, Wi-Fi ""hotspots"" may be placed at multiple locations within the network to increase the likelihood of access to data of a UE 102 through the network. In a cellular telephony network, the wireless access points 101 provide access to data and/or voice communications through the wireless telephony network. Accordingly, a wireless access point 101 is any device, system, software, or combination thereof operable to communicatively couple the UE 102 to the communication network 105 for the purposes of communicating data and/or voice to and from the UE 102.

The network processing element 110 is operable to process certain communications from the UE 102 through the wireless access points 101 (e.g., through the communication network 105) to locate the UE 102. In one embodiment, the network processing element 110 is operable to process certain training information and signal strength information of the UE 102 as the UE 102 trains with the wireless access points 101. For example, UEs are routinely configured with GPS receivers that can identify their geolocations when they are outdoors. And this geolocation information can be transmitted directly to the wireless network such that the network knows where a user is located, allowing the network to provide certain services and/or features to the user via the UE. However, when these UEs are indoors, the GPS signals are often blocked and prevent GPS receivers of the UEs from identifying their geolocations. Accordingly, the wireless telecommunication system 100 is operable to geolocate a UE 102 to a particular location 104 (e.g., location 104-7) through signal strength and channel estimation information during training of the UE 102 with the wireless access points 101 when GPS is impractical or otherwise unavailable.

The signal strength and channel estimation information may be gleaned from the UE 102 in multiple ways. For example, in an "offline phase" or training phase, each location of the UE 102 can be associated with a unique signature. The signature may include a concatenation of the signal strength and channel estimation information from the wireless access points 101 when the UE 102 is located at a known location. The signatures may be stored and then compared to subsequently obtained signal strength and channel estimation information of the UE 102. And, in an "online phase", when the signal strength and channel estimation information are received from the UE 102 at an unknown location by the wireless access points 101, that information may be concatenated and then compared with the signatures to find a match and estimate the location of the UE 102.

Figure 2:
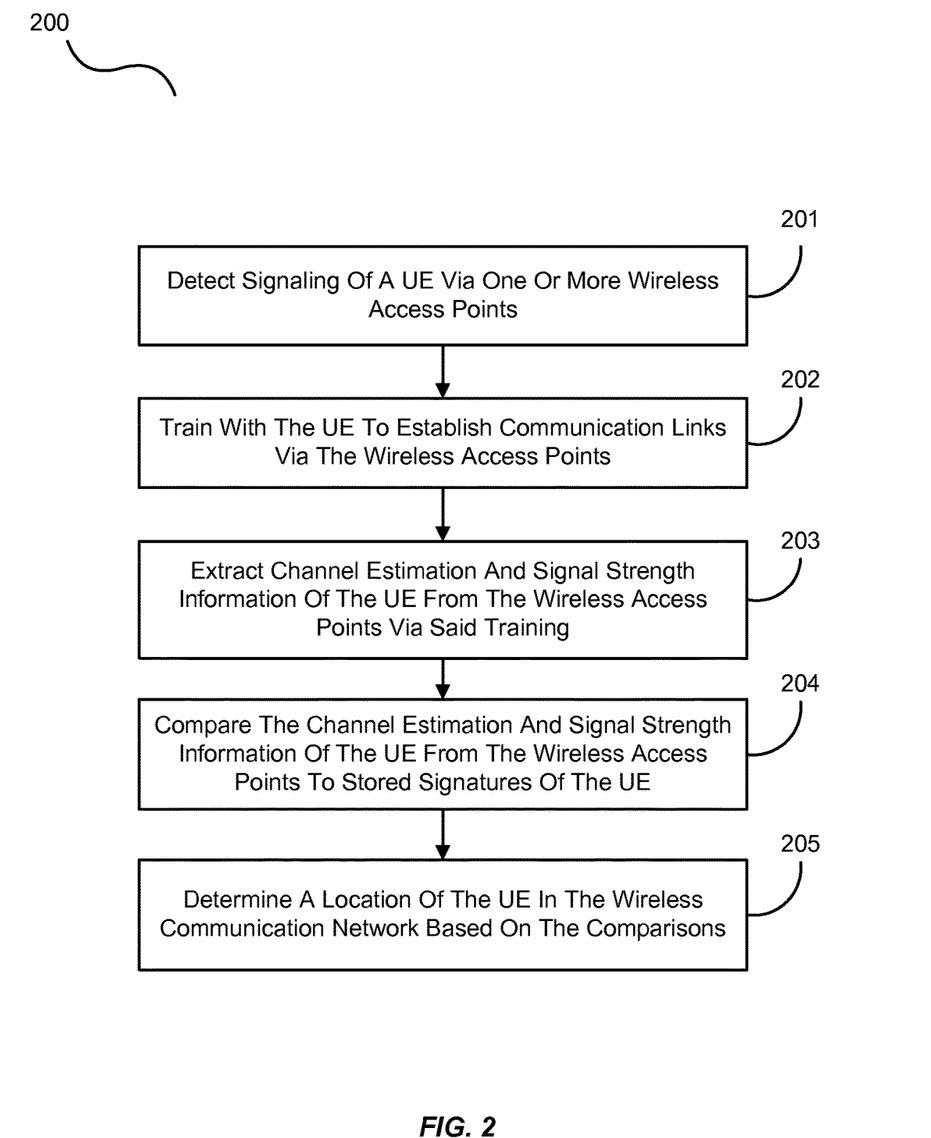
FIG. 2 is a flowchart illustrating an exemplary process of the wireless telecommunication system.

FIG. 2 is a flowchart illustrating an exemplary process 200 of the wireless telecommunication system 100. The process 200 initiates with one or more wireless access points 101 detecting signaling of the UE 102, in the process element 201. For example, Multiple Input/Multiple Output-Orthogonal Frequency Division Multiplexing (MIMO-OFDM) signaling is quickly becoming the dominant technology for broadband wireless networks such as Wi-Fi and Long Term Evolution (LTE) telephony. And, as the locations and antenna gains of the wireless access points 101 are known, certain information from this signaling can be extracted during training between the UE 102 and the wireless access points 101. This information, according to the inventive aspects hereof, is algorithmically processed to geolocate the UE 102. In this regard, the wireless access points 101 train with the UE 102 to establish communication links with the UE 102, in the process element 202. And, during this training, the channel estimation and signal strength information of the UE 102 from the wireless access points 101 is extracted, in the process element 203.

The channel estimation and signal strength information of the UE 102 extracted during training from the wireless access points 101 is compared to stored signatures of the UE 102, in the process element 204. For example, if two wireless access points 101-1 and 101-2 train with the UE 102, the network processing element 110 may extract the channel estimation and signal strength information from that training. The channel estimation and signal strength information from the wireless access point 101-1 may then be compared to previous detections of the channel estimation and signal strength information of the UE 102. Afterwards, the network processing element 110 determines a location of the UE 102 in the wireless telecommunication system 100 based on that comparison, in the process element 205, as exemplarily illustrated in FIG. 1 as the location 104-7.

Figure 3:
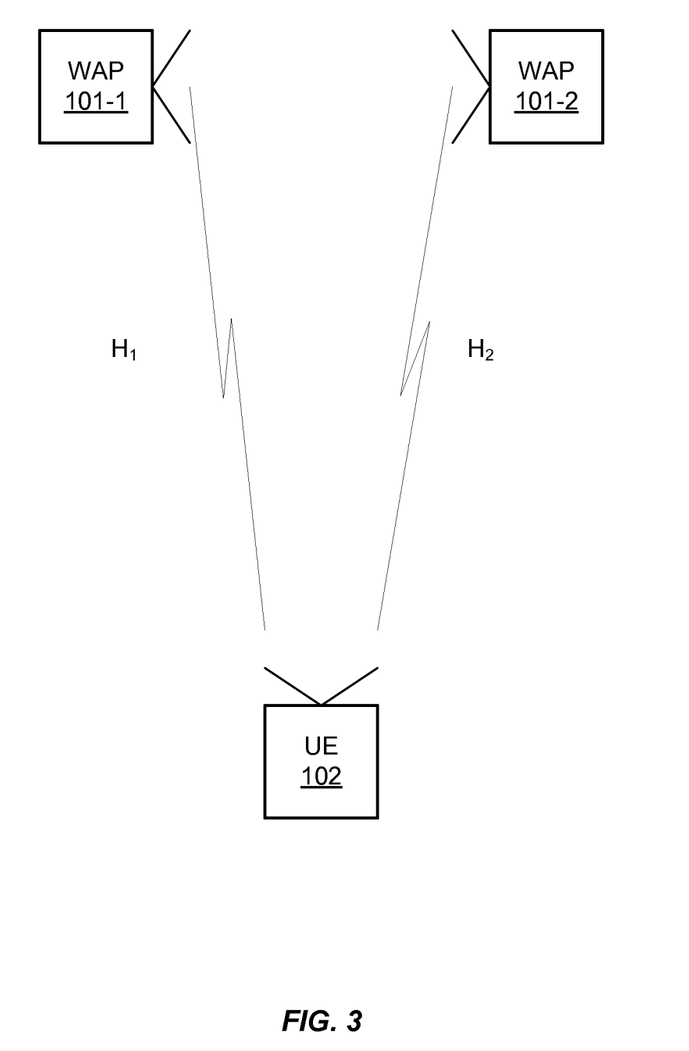
FIG. 3 illustrates an exemplary signaling technique used to locate a UE in the wireless telecommunication system.

Additional details regarding the algorithmic processing of the channel estimation and signal strength information are shown and described with respect to FIG. 3. However, the invention is not intended be limited to that particular embodiment as other information and/or additional information may be used to compute or otherwise refine the geolocation of the UE 102 in the wireless network.

FIG. 3 illustrates an exemplary algorithm used to locate a UE 102 in the wireless telecommunication system 100. In this embodiment, the MIMO-OFDM channel between the UE 102 and one or more of the wireless access points 101 is used to geolocate the UE 102 within the wireless telecommunication system 100, as exemplarily illustrated with the wireless access points 101-1 and 101-2. Channel estimation information pertaining to the MIMO-OFDM channels of the UE 102 is then used in addition to the received signal strength of the UE 102 by the wireless access points 101. For example, MIMO-OFDM channel estimation is used for decoding transmitted information and takes place at the wireless access points 101. When used with the received signal strength of the UE 102 by the wireless access point 101, the network processing element 110 can identify a geolocation of the UE 102 within the wireless telecommunication system 100.

In a WiFi 802.11n system with 4×4 MIMO configuration, 20 MHz signal bandwidth and 64 subcarriers (i.e., 52 data, 4 pilot, 1 null and 7 guard band subcarriers), the wireless access points 101 estimate 52 4×4 channel matrices to detect the transmitted signal of the UE 102. For the same bandwidth in LTE (i.e., the 20 MHz bandwidth), an even larger set of channel matrices is estimated due to the much smaller subcarrier spacing in the LTE system (e.g., 15 kHz spacing in LTE as opposed to 312.5 kHz in Wi-Fi). Accordingly, a much larger number of subcarriers in LTE exists (e.g., 2048 subcarriers in LTE as opposed to 64 subcarriers in Wi-Fi).

The channel estimation herein may use the pilot signals which are transmitted alongside the data and are used to obtain channel knowledge prior to decoding. In LTE, channel state information (CSI) reference signals are used for channel estimation. In 802.11n Wi-Fi, high throughput long training fields (HT-LTF) are used for the channel estimation. This means that a relatively large set of data (e.g., signatures) can be associated to any training location as opposed to a single received signal strength value.

To illustrate, a signal is transmitted by the UE 102 using multiple antennas and the signal is received by the wireless access points 101-1 and 101-2, each of which also being equipped with multiple antennas as well as being configured at known locations. Then, assume that there are $N_c$ subcarriers in the wireless telecommunication system 100. The MIMO-OFDM channel from the UE 102 to the wireless access point 101-1 (denoted as $H_{101\text{-}1}$) and the MIMO-OFDM channel from the UE 102 to the wireless access point 101-2 (denoted as $H_{101\text{-}2}$) can be defined as follows:

$$H_{101-1} = \begin{bmatrix} H_{101-1}^{(1)} \\ \vdots \\ H_{101-1}^{(N_c)} \end{bmatrix} \text{ and } H_{101-2} = \begin{bmatrix} H_{101-2}^{(1)} \\ \vdots \\ H_{101-2}^{(N_c)} \end{bmatrix}$$

and $H_{101\text{-}i}^{j}$, where $j \in \{1, \ldots, N_c\}$ and $i \in \{1, 2\}$, is the channel matrix from the UE 102 to the wireless access point 101-i on the subcarrier j.

When the antenna pattern of the UE 102 is directional, $H_{101\text{-}1}$ and $H_{101\text{-}2}$ can take different values for the same location but with different antenna orientations. In this regard, the wireless access point 101-1 normalizes $H_{101\text{-}1}$ by multiplying the antenna orientations to the ratio of the maximum antenna gain toward the wireless access point (the same for the wireless access point 101-2 and $H_{101\text{-}2}$). By denoting these normalization factors as $H_{101\text{-}4}$ and $\lambda_{101\text{-}2}$, these factors are then sent back to the wireless access points 101-1 and 101-2. Then, by denoting the received signal strength values received at the wireless access points 101-1 and 101-2 as $RSS_{101\text{-}1}$ and $RSS_{101\text{-}2}$, respectively, the fingerprint vector can be associated to the location of the UE 102 as:

$F=[H_{101\text{-}1}, H_{101\text{-}2}; \lambda_{101\text{-}1}, \lambda_{101\text{-}2}; RSS_{101\text{-}1}, RSS_{101\text{-}2}]$, which is then used to calculate the geolocation of the UE 102 in a manner similar to RSS geolocation processing except with more rich and accurate information.

When the UE 102 is "off-line", it can be thought of as being in a "recurring checking position information mode" in which the UE 102 operates at a lower code rate quadrature amplitude modulation (QAM) order so as to maximize the number of wireless access points 101 that can receive the training signal of the UE 102. Thus, by using more wireless access points 101, the accuracy of the geolocate within the telecommunication system 100 is improved, thereby extending the above algorithm as follows:

$$H_{101\text{-}1} = \begin{bmatrix} H^{(1)}_{101\text{-}1} \\ \vdots \\ H^{(N_c)}_{101\text{-}1} \end{bmatrix}, H_{101\text{-}2} = \begin{bmatrix} H^{(1)}_{101\text{-}2} \\ \vdots \\ H^{(N_c)}_{101\text{-}2} \end{bmatrix}, \ldots H_{101\text{-}N} = \begin{bmatrix} H^{(1)}_{101\text{-}N} \\ \vdots \\ H^{(N_c)}_{101\text{-}N} \end{bmatrix}$$

$H_i^j$ where $j \in \{1, 2, \ldots, N_c\}$ and $i \in \{1, 2, \ldots, N\}$ $F=[H_{101\text{-}1}, H_{101\text{-}2} \ldots, H_{101\text{-}N}; \lambda_{101\text{-}1}, \lambda_{101\text{-}2}, \ldots, \lambda_{101\text{-}N}; RSS_{101\text{-}1}, RSS_{101\text{-}2}, \ldots, RSS_{101\text{-}N}]$ As the location of the UE 102 can be accurately determined, the systems and methods described herein can be used to implement other features within the wireless telecommunication system 100. For example, UEs 102 can be configured to act as subservient or "proxy" wireless access points such as "hotspots" that can deliver information to other UEs 102. By being able to accurately geolocation UEs 102, the network processing element 110 can identify "clusters" and then designate one of the UEs 102 in the cluster as the subservient wireless access point. An example of such is illustrated in FIG. 4

Figure 4:
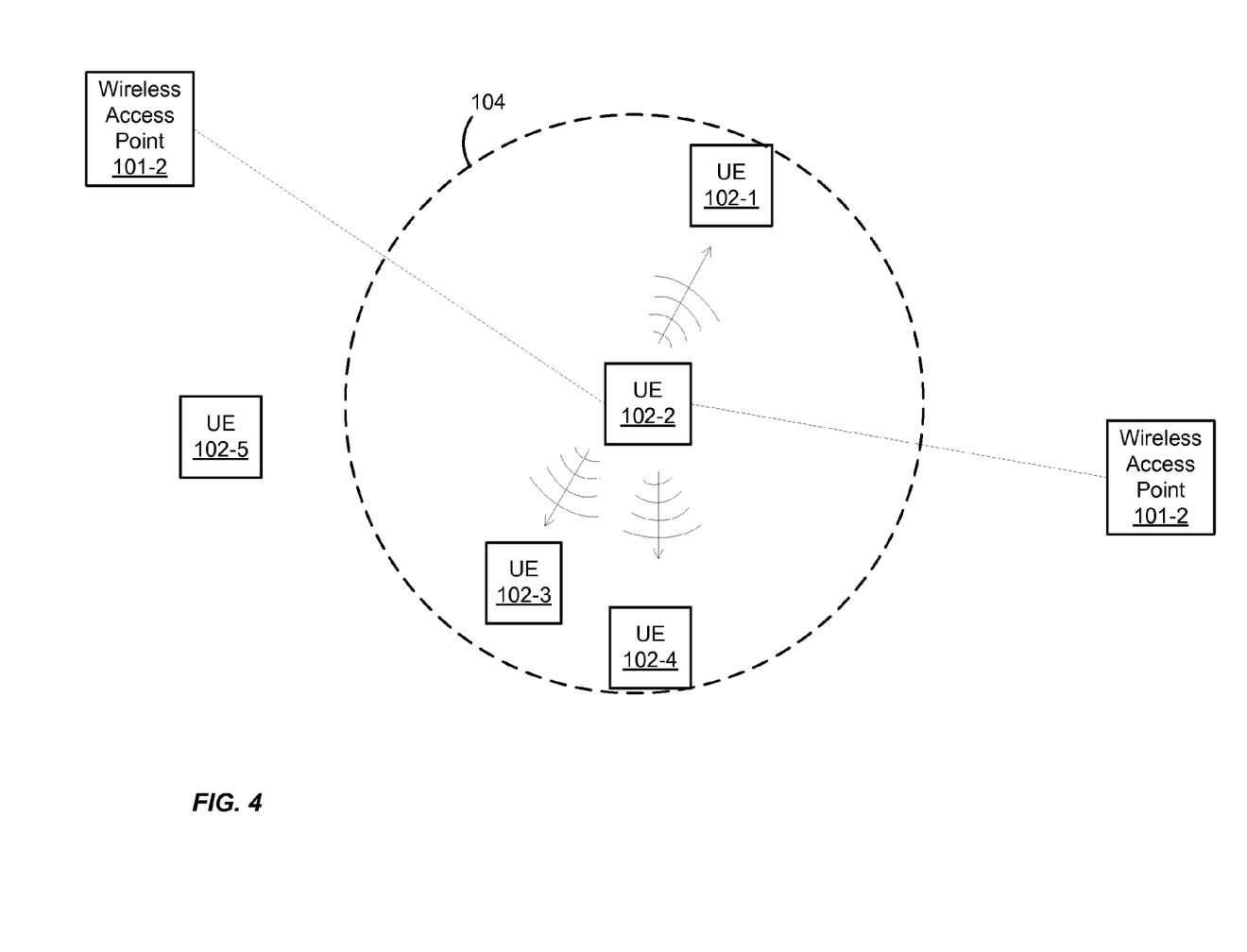
FIG. 4 is a block diagram of a cluster of UEs in the wireless telecommunication system.

FIG. 4 is a block diagram of a cluster of UEs 102 in a particular location 104 in the wireless telecommunication system 100. In this example, two wireless access points 101-1 and 101-2 are used to locate the UEs 102-1-102-4 within the location 104 in the wireless telecommunication system 100. As certain information about the UEs 102 is already known through training (e.g., received signal strength, device type, processing capabilities such as processor speed and/or memory size), the network processing element 110 may be able to designate one or more of the UEs 102 as a subservient wireless access point.

To illustrate, the wireless access points 101-1 and 101-2 have located the UEs 102-1-102-4 within the location 104. The network processing element 110, being communicatively coupled to the wireless access points 101-1 and 101-2, may deem the UE 102-2 as the subservient wireless access point to the wireless access points 101-1 and 101-2. From there, the UE 102-2 can operate as an intermediary wireless access point on behalf of the wireless access points 101-1 and 101-2 to the remaining UEs 102-1, 102-3, and 102-4. Thus, UEs 102-1, 102-3, and 102-4 can communicate through the communication network 105 through the UE 102-2.

Figure 5:
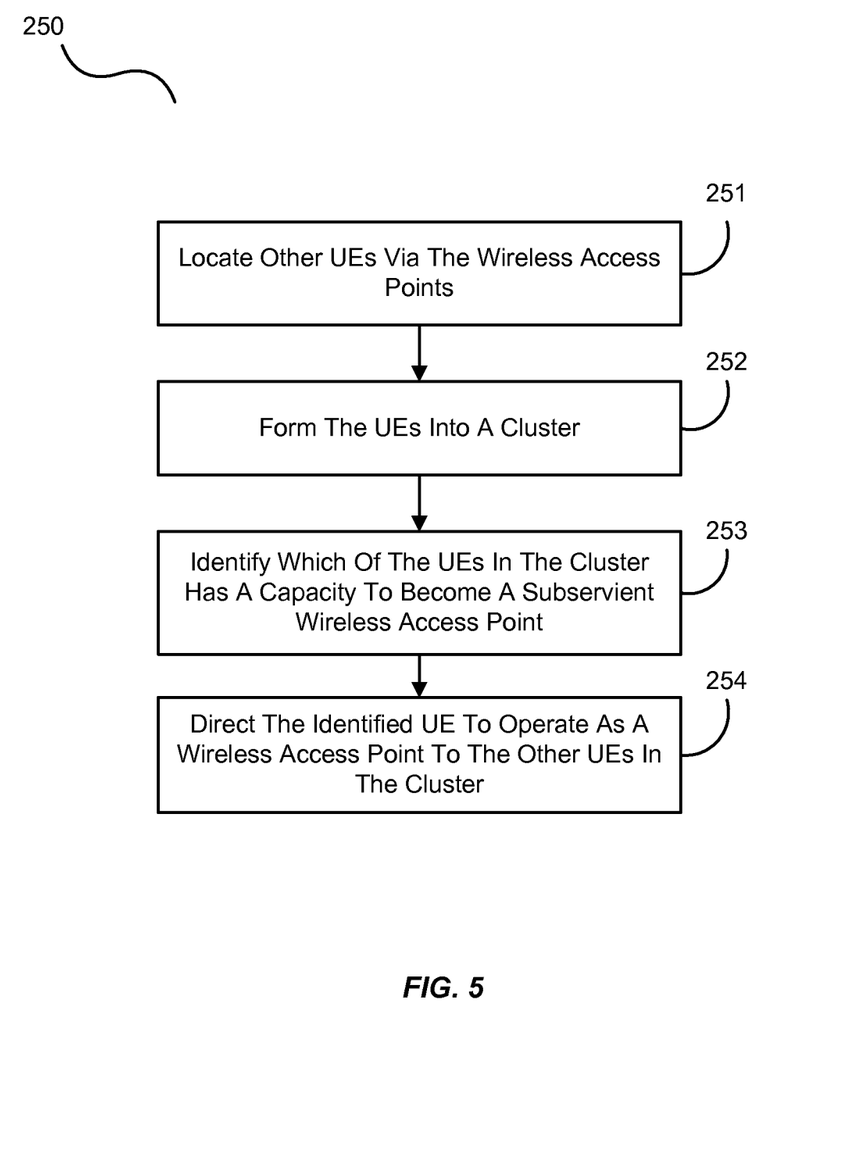
FIG. 5 is a flowchart illustrating another exemplary process of the wireless telecommunication system.

This operation is now shown and described with respect to the process 250 illustrated a flowchart of FIG. 5. In this embodiment, the network processing element 110 locates the other UEs 102 (e.g., in a manner similar to the geolocation of the UE 102-2), in the process element 251. Then, based on those geolocations, the network processing element 110 determines that 102-1, 102-3, and 102-4 are in the same relative location 104 as the UE 102-2 and thereby forms a cluster from the UEs 102-1-102-4, in the process element 252.

After the cluster is formed, the network processing element identifies which of the UEs 102-1-102-4 in the cluster has a capacity to serve as a subservient wireless access point to the other UEs 102 in the cluster, in the process element 253. For example, the network processing element 110 may determine that one particular UE 102 (e.g., UE 102-2) has a processing capability and/or signal strength capable of providing wireless access between the communication network 105 and the remaining UEs 102 in the cluster. Afterwards, the network processing element 110 directs the identified UE 102 to operate as the wireless access point to the other UEs 102 in the cluster, in the process element 254.

The determination of the capacity of a particular UE 102 to serve as a subservient wireless access point 101 may be selected as a matter of design choice. As mentioned, this capacity determination may be based on a processing capability and/or a signal strength of the UE 102. But, other factors may be used in the determination. For example, if it is determined that all of the UEs 102 are Bluetooth compatible, the network processing element 110 may choose the UE 102-2 to operate as the wireless access point to the UEs 102-1, 102-3, and 102-4 via Bluetooth communications because it has the highest signal strength to the wireless access points 101. But, suppose now that the UE 102-2 has the highest signal strength to the wireless access points 101 but is incapable of serving as a subservient wireless access point to the remaining UEs 102 in the cluster (e.g., because it is a simple cell phone with no other networking features). Accordingly, the network processing element 110 may direct one of the other UEs 102 to serve as the subservient wireless access points of the remaining UEs 102 in the cluster.

The embodiments herein may provide certain advantages, particularly to the communication network 105. For example, CSMA/CA MAC protocol, used in 802.11 wireless networks, relies on carrier sensing and collision avoidance. Because of the distributed nature of this protocol, channel utilization degrades when a large number of users compete for channels due to an increased number of collisions/retransmissions, hidden node/exposed node problems from a large number of Wi-Fi users, etc. The embodiments shown and described herein reduce the number of users communicating with the wireless access points 101 and, thus, improve channel utilization and reduce contention among users.

Additionally, network capacity problems can be avoided through the embodiments disclosed herein. For example, in a conference many users may employ UEs 102. But, each of those users may be there to observe the same material on their respective UEs. If a single channel is established to a UE 102 to operate as a proxy wireless access point to the remaining UEs 102 in the conference (i.e., the cluster), then the capacity of the communication network 105 can be used for other purposes (e.g., other UEs 102). Moreover, the embodiments may be used to provide load balancing for the communication network 105. For example, back office processing by the communication network 105 may determine that some users of the UEs 102 in a cluster may be observing similar content on their respective UEs 102 whereas others may be observing completely dissimilar content. Based on these determinations by the back office processing, the communication network 105 may aggregate and/or compress that content and designate it with a particular priority compared to the content viewed by the other users. In other words, the communication network 105 may adaptively determine how to balance the capacity to the subservient wireless access point of a designated UE 102 based on the content being delivered to the remaining UEs 102 in the cluster.

Based on the forgoing, the invention is not intended be limited to any particular embodiment or determination in which UE 102 is to be designated as the subservient wireless access point. Nor is the invention intended to be limited to any particular form of communications in which a designated UE 102 is to operate as a subservient wireless access point. Examples of communications that may be used include WiFi, Bluetooth, Infra Red, and the like. It should also be noted that, while the exemplary embodiments illustrate the geolocationing of the UEs 102 with two or more wireless access points 101, the invention is not intended to be limited to such. The embodiments herein may be able to accurately geolocate a UE 102 using a single wireless access point 101, indoors or outdoors. Multiple wireless access points can be used to refine the geolocation of the UE 102.

Figure 6:
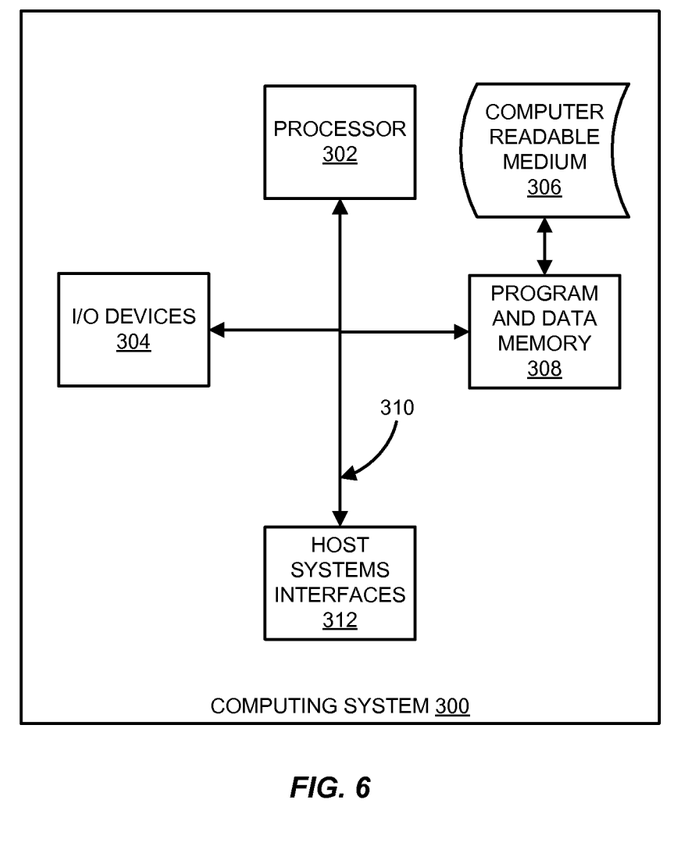
FIG. 6 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A method of locating user equipment (UE) in a wireless communication network, the method comprising:
    detecting signaling of a UE via multiple wireless access points in the wireless communication network while the UE is in an offline phase;
    training the wireless access points with the UE while the UE is in the offline phase;
    storing signatures via said training with the UE, each stored signature comprising signal strength and Multiple Input/Multiple Output-Orthogonal Frequency Division Multiplexing (MIMO-OFDM) channel estimation information for the multiple wireless access points;
    normalizing the MIMO-OFDM channel estimation information of the stored signatures by multiplying antenna orientations of the UE to a ratio of maximum antenna gain of the UE towards each wireless access point;
    detecting that the UE has entered an online phase;
    comparing MIMO-OFDM channel estimation and signal strength information of the UE for each of the wireless access points, while the UE is in the online phase, to the stored signatures; and
    determining a location of the UE in the wireless communication network based on the comparisons.

2. The method of claim 1, further comprising:
    forming multiple UEs into a cluster;
    determining which of the UEs in the cluster has a capacity operable to form the UE into a subservient wireless access point; and
    directing the determined UE to operate as the subservient wireless access point to the remaining UEs in the cluster.

3. The method of claim 2, wherein:
    the capacity comprises a signal strength of the UE, a processor speed of the UE, a memory size of the UE, or a combination thereof.

4. The method of claim 2, wherein:
    directing the determined UE to operate as the subservient wireless access point further comprises directing the determined UE to communicate to the remaining UEs in the cluster via WiFi, Bluetooth, Infra Red, or a combination thereof.

5. The method of claim 1, wherein:
    the wireless communication network comprises WiFi signaling, Long Term Evolution signaling, or a combination thereof.

6. The method of claim 1, wherein:
    the online phase operates at a higher code rate Quadrature Amplitude Modulation (QAM) than the offline phase.

7. A system of locating user equipment (UE) in a wireless communication network, the system comprising:
    multiple wireless access points, wherein each wireless access point is operable to detect signaling of a UE in the wireless communication network while the UE is in an offline phase, and to train with the UE while the UE is in the offline phase; and
    a network processing element communicatively coupled to the wireless access points and operable to store signatures via said training with the UE, each stored signature comprising signal strength and Multiple Input/Multiple Output-Orthogonal Frequency Division Multiplexing (MIMO-OFDM) channel estimation information for the multiple wireless access points, to normalize the MIMO-OFDM channel estimation information of the stored signatures by multiplying antenna orientations of the UE to a ratio of maximum antenna gain of the UE towards each wireless access point, to detect that the UE has entered an online phase, to compare MIMO-OFDM channel estimation and signal strength information of the UE for each of the wireless access points, while the UE is in the online phase, to the stored signatures, and to determine a location of the UE in the wireless communication network based on the comparisons.

8. The system of claim 7, wherein:
the network processing element is further operable to determine a location of another UE in the wireless communication network via the wireless access points, form the UEs into a cluster, determine which of the UEs in the cluster has a capacity operable to form the UE into a subservient wireless access point, and to direct the determined UE to operate as the subservient wireless access point to the remaining UEs in the cluster.

9. The system of claim 8, wherein:
the capacity comprises a signal strength of the UE, a processor speed of the UE, a memory size of the UE, or a combination thereof.

10. The system of claim 8, wherein:
the network processing element is further operable to direct the determined UE to operate as the subservient wireless access point further comprises directing the determined UE to communicate to the remaining UEs in the cluster via WiFi, Bluetooth, Infra Red, or a combination thereof.

11. The system of claim 7, wherein:
the wireless communication network comprises WiFi signaling, Long Term Evolution signaling, or a combination thereof.

12. The system of claim 7, wherein:
the online phase operates at a higher code rate Quadrature Amplitude Modulation (QAM) than the offline phase.

13. A non-transitory computer readable medium operable in a network processing element of a wireless communication network, the computer readable medium comprising instruction that, when executed by the network processing element, direct the network processing element to:
detect signaling of a UE via multiple wireless access points in the wireless communication network while the UE is in an offline phase;
train the wireless access points with the UE while the UE is in the offline phase;
store signatures via said training with the UE, each stored signature comprising signal strength and Multiple Input/Multiple Output-Orthogonal Frequency Division Multiplexing (MIMO-OFDM) channel estimation information for the multiple wireless access points;
normalize the MIMO-OFDM channel estimation information of the stored signatures by multiplying antenna orientations of the UE to a ratio of maximum antenna gain of the UE towards each wireless access point;
detect that the UE has entered an online phase;
compare MIMO-OFDM channel estimation and signal strength information of the UE for each of the wireless access points, while the UE is in the online phase, to the stored signatures; and
determine a location of the UE in the wireless communication network based on the comparisons.

14. The computer readable medium of claim 13, further comprising instructions that direct the network processing element to:
form multiple UEs into a cluster;
determine which of the UEs in the cluster has a capacity operable to form the UE into a subservient wireless access point; and
direct the determined UE to operate as the subservient wireless access point to the remaining UEs in the cluster.

15. The computer readable medium of claim 14, wherein:
the capacity comprises a signal strength of the UE, a processor speed of the UE, a memory size of the UE, or a combination thereof.

16. The computer readable medium of claim 14, further comprising instructions that direct the network processing element to:
direct the determined UE to operate as the subservient wireless access point further comprises directing the determined UE to communicate to the remaining UEs in the cluster via WiFi, Bluetooth, Infra Red, or a combination thereof.

17. The computer readable medium of claim 13, wherein:
the online phase operates at a higher code rate Quadrature Amplitude Modulation (QAM) than the offline phase.

* * * * *